Sept. 22, 1964   J. S. GREEN V   3,150,364
ANTI-COLLISION DETECTION AND WARNING SYSTEM
Filed May 6, 1959   9 Sheets-Sheet 1

James Sproat Green, V   Inventor

By

Attorney

James Sproat Green, V Inventor

By Richard H. Nagel

Attorney

James Sproat Green, V Inventor

James Sproat Green, V  Inventor

Sept. 22, 1964    J. S. GREEN V    3,150,364
ANTI-COLLISION DETECTION AND WARNING SYSTEM
Filed May 6, 1959    9 Sheets-Sheet 7

James Sproat Green, V  Inventor
By Richard H. Nagel
                    Attorney

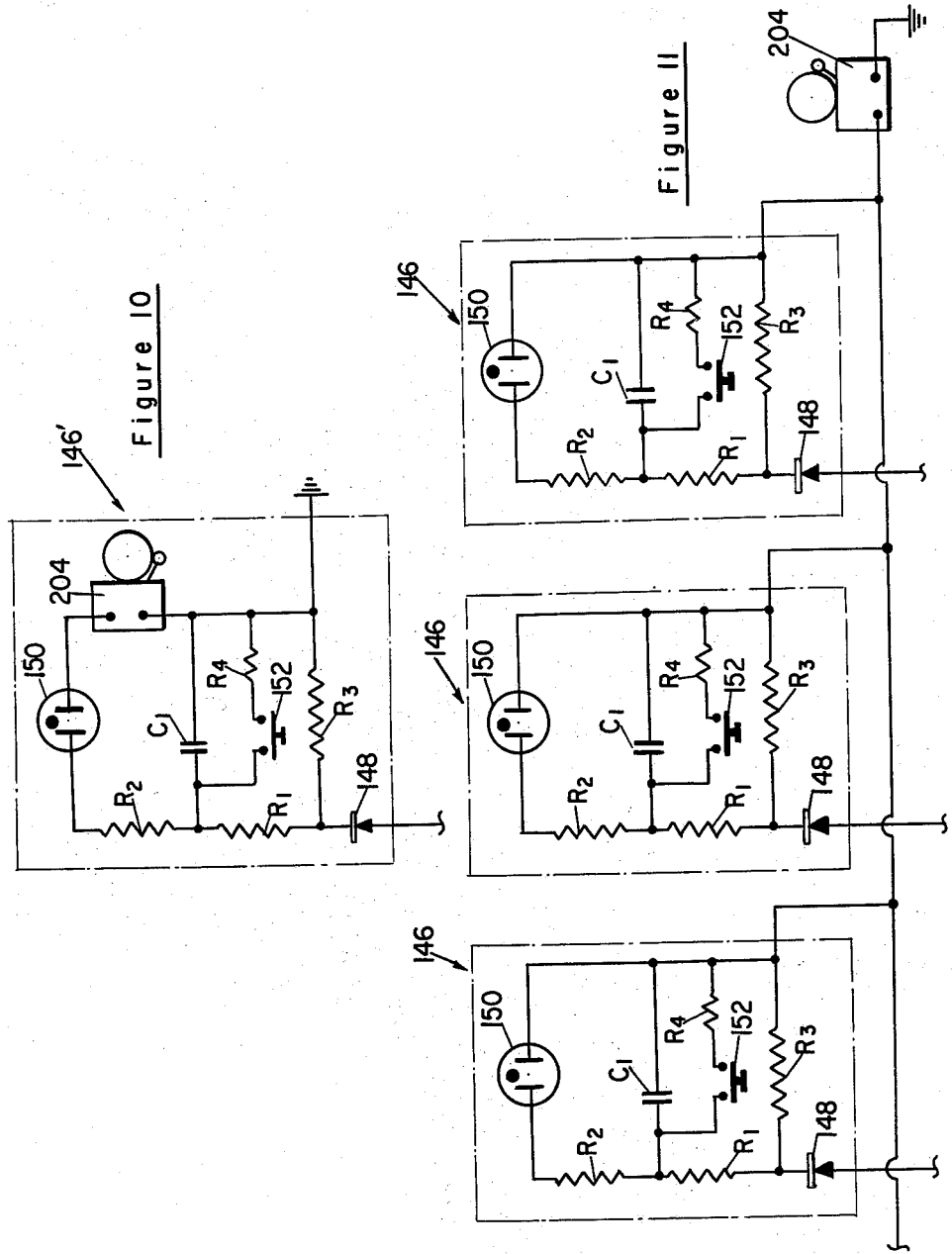

Sept. 22, 1964  J. S. GREEN V  3,150,364
ANTI-COLLISION DETECTION AND WARNING SYSTEM
Filed May 6, 1959  9 Sheets-Sheet 9

James Sproat Green, V Inventor
By Kenyon & Kenyon
Attorneys

United States Patent Office 3,150,364
Patented Sept. 22, 1964

3,150,364
ANTI-COLLISION DETECTION AND
WARNING SYSTEM
James Sproat Green V, 712 Salem Ave., Elizabeth, N.J.
Filed May 6, 1959, Ser. No. 811,449
20 Claims. (Cl. 343—7)

This invention relates to a method and means for establishing the position of target objects with respect to a base object by radio detection and ranging (radar). It relates particularly to a radar method and means for establishing the position of target objects with respect to a base object with both target and base objects being of a mobile nature as in the cases of aircraft and marine vessels, and it relates more particularly to a radar method and means for establishing the position of a mobile target object with respect to a mobile base object wherein and whereby warning will be given of a constant bearing of said target object with respect to said base object.

In the science of navigation it is well known that if two vessels, be they either aircraft or marine vessels or one and the other, maintain a constant true bearing one with respect to the other and the distance or range between them is decreasing due to the motion of either or both of them, they will collide eventually unless something be done to provide a change of bearing or halt the decrease of if not actually increase the range from one vessel to the other. A "true" bearing is defined as one taken with reference to a set of coordinates which may have an origin at the observer's plane or ship, but which is of fixed orientation in space, that is, of an orientation independent of the heading or other attitude of the ship or plane of the observer.

Bearings are ordinarily expressed in degrees. They are called azimuth when taken in a horizontal plane and elevation when taken above or below this plane, that is, in a vertical plane. True bearings in the horizontal plane are measured clockwise from North taken as either 000° or 360° around through East (090°), South (180°), West (270°), and back to North. Relative bearings in the horizontal plane are measured clockwise from some point on the observer's ship or aircraft with respect to a base line thereon. Customarily an observer takes the longitudinal axis of his craft as a base line with a target object dead ahead being considered at a relative bearing of 000°, while one dead astern bears 180° relative. True bearings in the vertical plane are measured up or down from 00° with respect to a plane parallel to the earth's surface while relative bearings of this kind are taken with respect to some plane having a fixed and predetermined relation with the observer's own ship or aircraft, the plane of the deck or the wings for example. Complete definition of bearing includes information regarding both azimuth and elevation.

It is apparent that if a person be responsible for the safe navigation of an aircraft or a marine vessel he must be constantly alert whenever other aircraft or ships or substantial stationary objects are nearby to detect and take proper measures to terminate any situations of unchanging bearing and shortening range, particularly when the range is short already. In other words, a navigator or pilot must not allow his vessel or aircraft to remain very long on a collision course with any other ship or plane or with any stationary object of appreciable size.

To determine the existence of a potential collision situation, a navigator or pilot must have continuous and precise knowledge of the positions of other ships, aircraft, and land masses in his vicinity. From the point of view of the navigator, all bodies beyond his own vessel or aircraft may be designated target objects or targets. Detection of these objects, determination of their bearing and range, and, to some extent, recognition of their character may be effected by the methods and means of radio detection and ranging or radar.

Numerous texts have been written on the subject of radar. Three representative works are Radar System Fundamentals (Nav. Ships 900,017), Bureau of Ships, Washington, 1944; Radar Primer, J. L. Hornung, New York, 1948; and Principles of Radar, 3rd ed., J. F. Reintjes and G. T. Coate (M.I.T. Radar School Staff), New York, 1952. The existence of these texts indicates that while the radar art may be one still capable of great development, there is a well-established body of basic knowledge relating to it. In order that the setting of the present invention may be understood clearly, certain principles of radar will be reviewed briefly.

In a radar system, detection of targets is accomplished by directing a beam of radio-frequency energy from the antenna of a transmitter over a region to be searched. When the beam strikes a reflecting object, energy is reradiated. A very small part of this energy is returned to the radar system as an echo. A sensitive receiver located near the transmitter and which may use the same antenna as the transmitter can detect the echo signal and therefore the presence of the object or target. The determination of the actual range and bearing is based on the facts that radio-frequency energy travels at the constant speed of light, and that the receiver can be made directional.

Radar systems may be classified according to their transmission characteristics and are of three general kinds, continuous wave, frequency modulated, and pulse modulated. Of these pulse modulated system is the one in by far the greater use. In this system the radio-frequency energy is transmitted in pulses of microsecond duration. By a switching arrangement the transmitter is turned off before the reflected energy returns from the target, and the receiver is table to distinguish between a transmitted pulse and a reflected pulse. After all reflections have returned, the transmitter is turned on again and the process repeated. The receiver output is applied to an indicator or indicators for presentation of data in an appropriate form.

Data obtained by a radar system is customarily presented by luminous traces or spots on the face or faces of one or more cathode ray tubes. There are at least fifteen designated types of such visual presentation, A through P, and which one or ones will be used will depend on the particular purpose to be served by a given radar system. Of these several presentations, however, types A, B, and P are basic, while type E which is a modification of the basic B and P types is a specialized presentation of interest for purposes of this invention.

In type A presentation the strength of an echo is indicated by vertical displacement of a luminous spot with respect to a grid on the face of a tube, and the range of the target object from which the echo originated is indicated by horizontal displacement of the spot. In type B presentation the range of a target is indicated by vertical displacement of a spot on a tube face, and its azimuth angle by horizontal displacement of the spot. In type P presentation (often called PPI for Plan Position Indication), radial displacement of a spot from the center of a tube face indicates the range of a target, and the angular displacement of the spot with reference to the base line of a polar coordinate system indicates target azimuth angle.

In type E presentation vertical displacement of a spot on a tube face grid may be made to indicate either target elevation angle or target elevation distance, a height measurement, while horizontal displacement of the spot indicates target range. It should be noted that all prior references to "elevation" in this specification have contemplated this as an angular measurement, and unless particularly indicated otherwise all following references to "elevation" should be taken in this same sense.

Many ships and aircraft which carry radar systems are provided also with gyrocompasses and stable elements. By appropriate utilization of these apparatuses or repeater mechanisms therefrom, true as well as relative angular quantities in azimuth and elevation may be indicated.

Among the major, well recognized employments of radar in ships and aircraft are search, fire control, and identification-friend or foe (IFF). A separate radar system may be furnished for each of these employments. This invention is concerned with the search system which for completeness may be called upon to locate targets in two angular coordinates, azimuth and elevation, as well as in range. For such locating a multiple antenna system with beam switching may be used. This invention is only concerned, however, with search systems having an antenna which can be variably oriented with respect to its support structure to search through at least arcs of azimuth and elevation greater than the corresponding width and depth dimensions of the transmitted energy beam itself.

There are several scanning or searching patterns which may be used in this case. One is the helical scan and another is the precessing conical scan. In helical scanning a radar antenna rotates in azimuth, either consecutively through a series of full turns or back and forth through a sector, and also wobbles up and down in elevation. Rotation or oscillation in azimuth is usually faster than wobble in elevation. In precessing conical scanning the radar antenna is sun so that its beam describes a cone around an axis which is perpendicular to the axis of azimuth rotation, and then the spinning antenna is rotated or oscillated about the azimuth axis.

The precessing conical scan may be preferred when searching is to be done through limited azimuth and a fairly wide elevation arc. When full azimuth searching through 360° is desired, however, as will be the case with most installations on marine vessels and a considerable number of aircraft, the helical scan will be preferred. Employment of a helical scan will be presumed here. Obviously if use of this invention be suitable in the instance of an antenna which can be variably oriented with respect to its support structure to search through arcs of both azimuth and elevation, it will be suitable also in the separate cases of an antenna transmitting a narrow but rather deep beam which is rotated or oscillated only in azimuth, and an antenna transmitting a wide but quite shallow beam which is wobbled only in elevation.

Consider the situation of an observer responsible for navigation of a marine vessel or an aircraft equipped with search radar. As he watches the spots representing targets which appear on the faces of his cathode ray tubes, he may notice one or some of them remaining on constant azimuth in a type B or P presentation and on constant elevations in a type E presentation. Upon detecting any conditions such as these, the observer should then study the variation in range of the target or targets in question. Whenever range is shortening with true azimuth and elevation remaining constant, a collision is bound to occur eventually if nothing be done to change the situation.

In order that he may take early and adequate action to avoid collisions, the observer-navigator will want to know as soon as possible when a target is indeed on a collision course with him or he with it. He may, of course, detect many such situations simply by studying the presentation screens or cathode ray tube faces of his search receiver. There is, nevertheless, the possibility that however hard he studies he will inadvertently overlook a target which is on a collision course with his ship or plane until the time left for taking evasive action is too little. Another consideration is that the observer-navigator simply may not be able to spend substantially his full time studying radar scan presentations. An automatic signal system to give positive warning of a target on a collision course would be of obvious utility.

According to this invention, an anti-collision detection and warning system for marine vessels, aircraft, and land installations is provided. In this system there is one pulse distributor operating in synchronism with movement of a search radar antenna in azimuth. There is another pulse distributor operating in synchronism with movement of a search radar antenna in elevation. Each of these distributors is connected to a plurality of separate pulse integrating circuits, and each of these circuits will trigger a warning signal when the number of radar pulses from a certain direction has been sufficient to charge the circuit to the point that firing potential is created across a neon bulb.

The nature and substance of this invention may be more clearly perceived and fully understood by referring to the following description and claims taken in connection with the accompanying drawings in which:

FIGURE 10 represents a schematic diagram of a warning lamp charging circuit generally similar to that shown in FIGURE 5, but including an audible warning means in series with the warning lamp;

FIGURE 11 represents a schematic diagram of a plurality of warning lamp charging circuits similar to that shown in FIGURE 5, these circuits being connected to a common ground line including an audible warning means and this audible warning means being in series with the warning lamp of each of the circuits;

Figure 5:
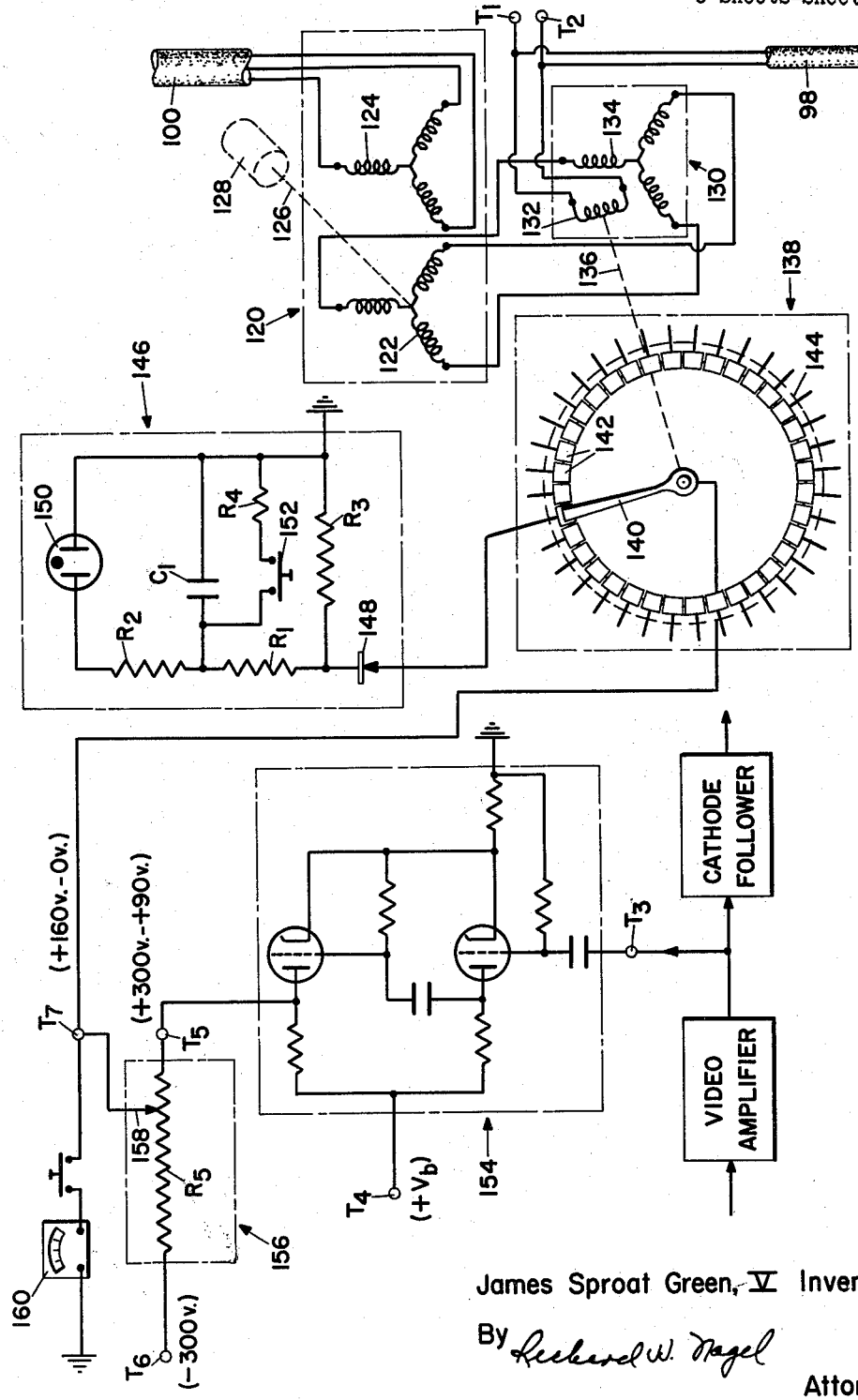
FIGURE 5 represents a schematic diagram of an echo pulse distributor adapted to cooperate with a type P presentation of data from the antenna of FIGURES 3 and 4, and a representative constant azimuth warning lamp charging circuit associated therewith according to this invention.
Figure 12:
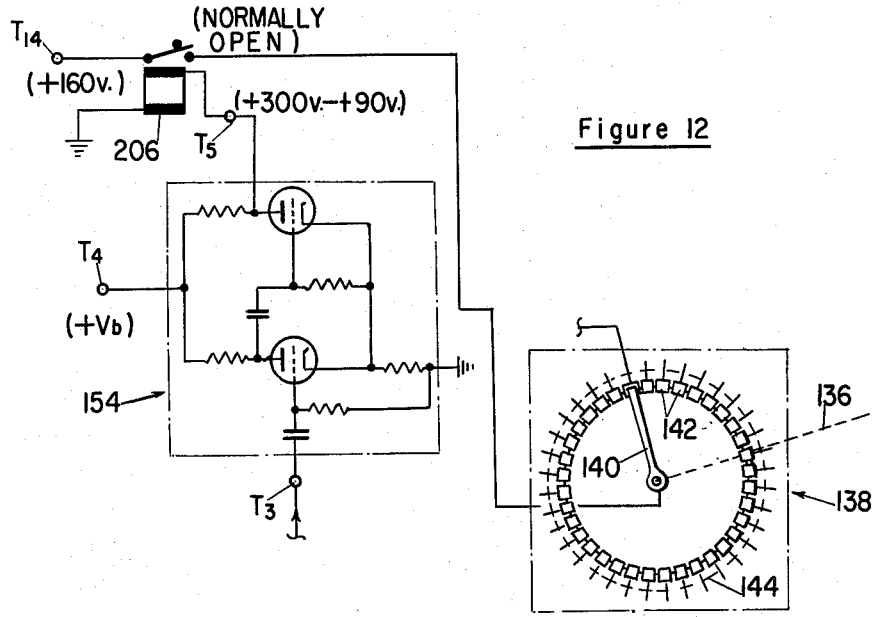
Figure 13:
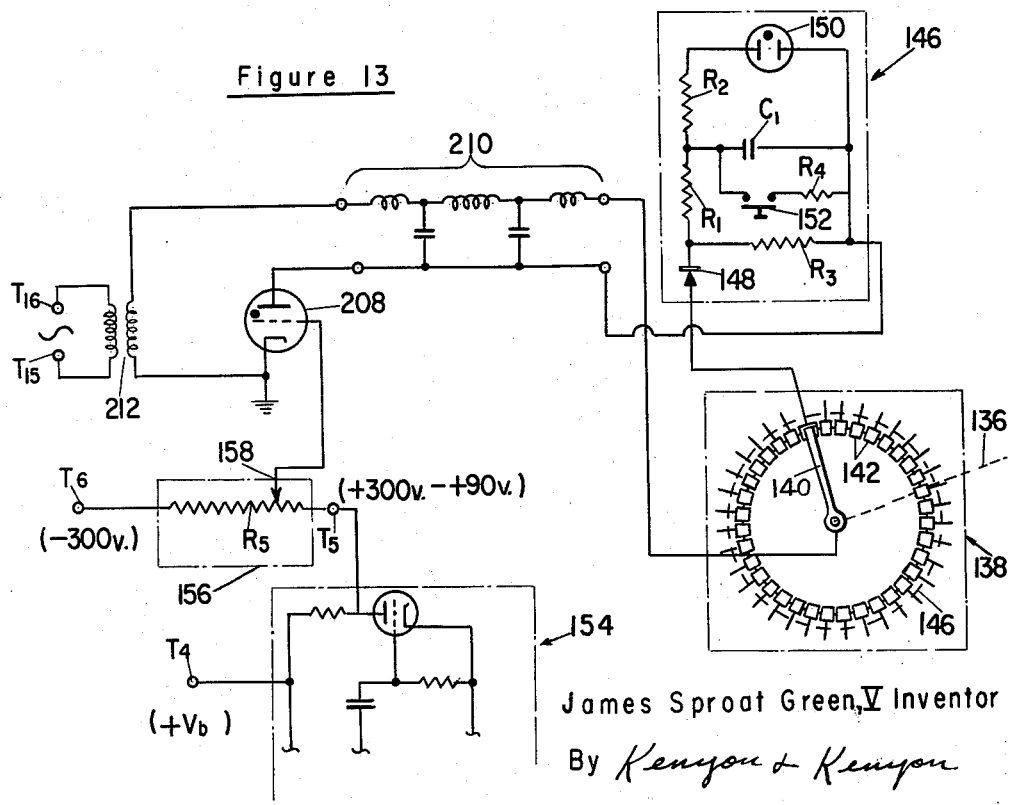

FIGURE 12 represents a portion of the schematic diagram of FIGURE 5 wherein an electro-mechanical relay controlling the application of voltage from an external source to the hub of the armature of the pulse distributor has been substituted for the potentiometer shown in FIGURE 5, and FIGURE 13 represents a portion of the schematic diagram of FIGURE 5 additionally including a half wave rectifying thyratron circuit, this circuit being connected on its input side to a source of alternating voltage and on its output side to the hub of the armature of the pulse distributor, and having the grid element of its thyratron tube connected to the output side of the multivibrator through the slider element of the potentiometer shown in FIGURE 5.

Figure 1:
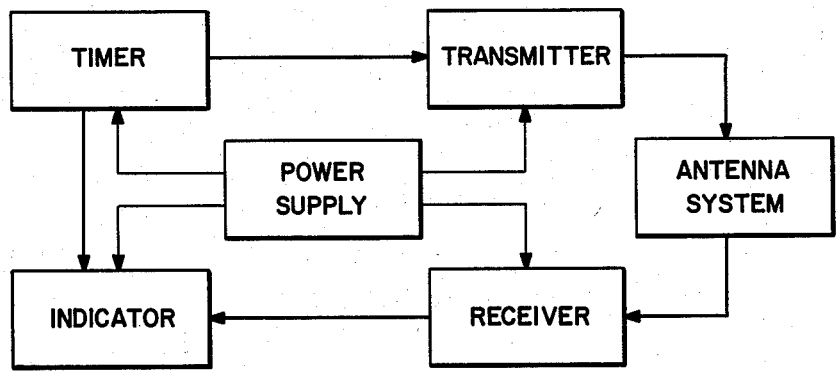
FIGURE 1 represents a functional block diagram of a fundamental pulse-modulated radar system.
Figure 2:
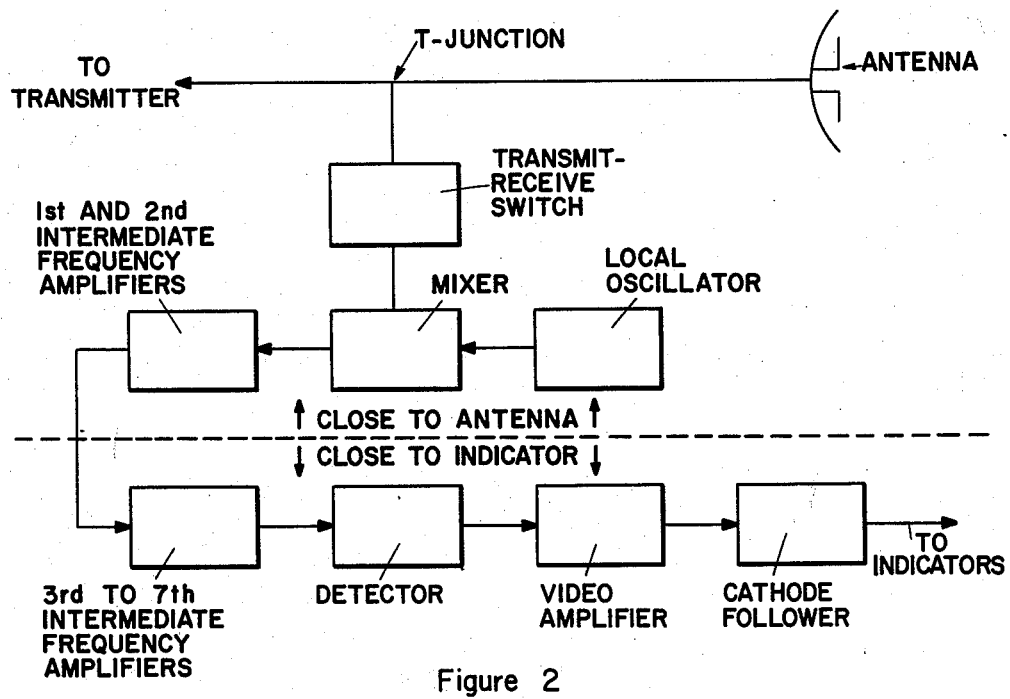
FIGURE 2 represents a block diagram of a possible distribution of radar receiver components.

Referring now to FIGURES 1 and 2, block diagrams of a fundamental pulse-modulated radar system including a receiver and a radar receiver alone are given to illustrate the general background in which the present invention functions. In the radar system of FIGURE 1, the timer supplies the synchronizing signals which time the transmitted pulses and the indicator, and which coordinate other associated circuits. The transmitter generates radio-frequency energy in the form of short, relatively powerful pulses. The antenna system takes the radio-frequency energy from the transmitter; radiates it in a directional beam; receives any echo pulses returning from a target; and passes these echo pulses to the receiver. The receiver amplifies the relatively weak radio-frequency pulses returned by the target, and reproduces them as video pulses to be applied to the indicators. The indicators produce visual indications of the echo pulses in a manner which furnishes the required information in the form desired as, for example, type A, B, E, or P presentations, or a combination of them. The power supply furnishes all the alternating and direct voltages necessary for operation of the system components.

In the radar receiver diagram of FIGURE 2 is shown one representative distribution of components which makes it possible to locate the frequency-conversion portion of the receiver in the immediate vicinity of the antenna and the video-amplifier portion in the vicinity of the indicators. The indicators themselves will, of course, be located where their data presentation or presentations may be viewed easily by a pilot or navigator. Such location would likely be in the cockpit or on the flight deck of an aircraft, or in the pilot house or on the navigating bridge of a marine vessel.

Figure 3:
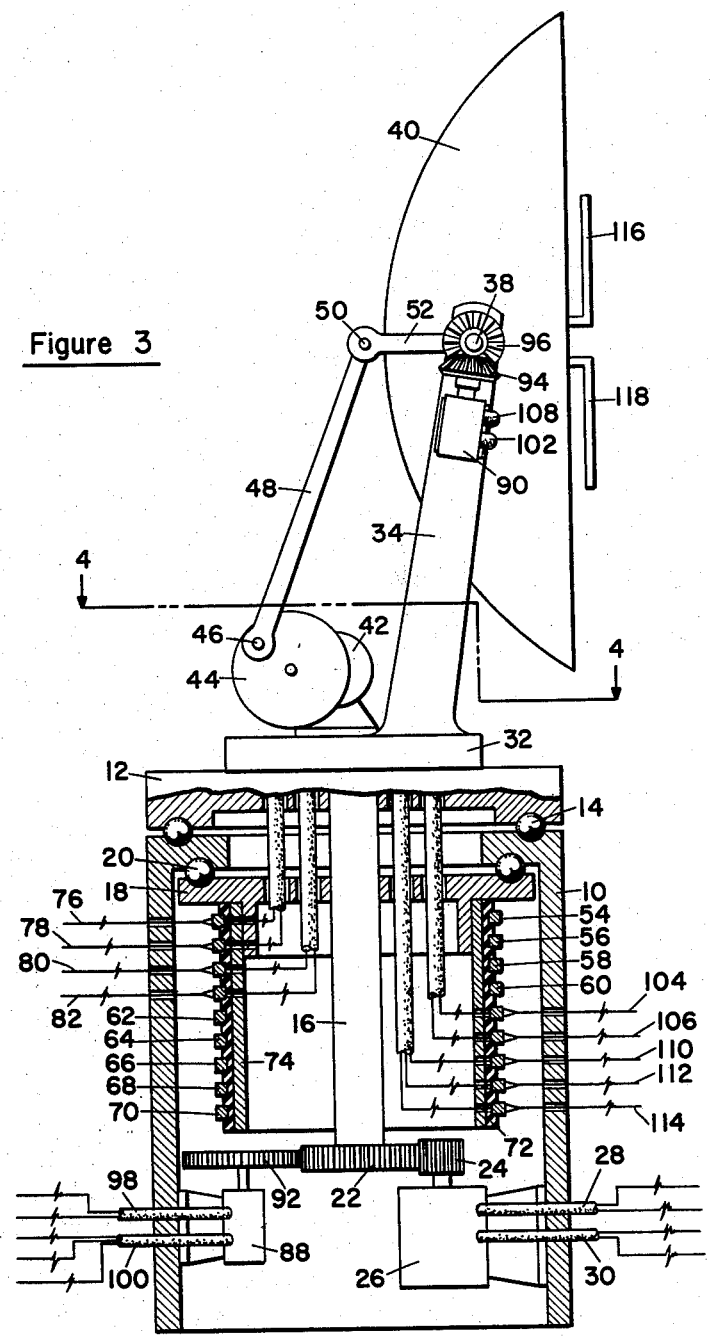
FIGURE 3 represents a side elevation view, partially in section, of a radar antenna and mechanical-electrical supporting, operating, and position transmitting apparatus therefor, adapted for helical scanning.
Figure 4:
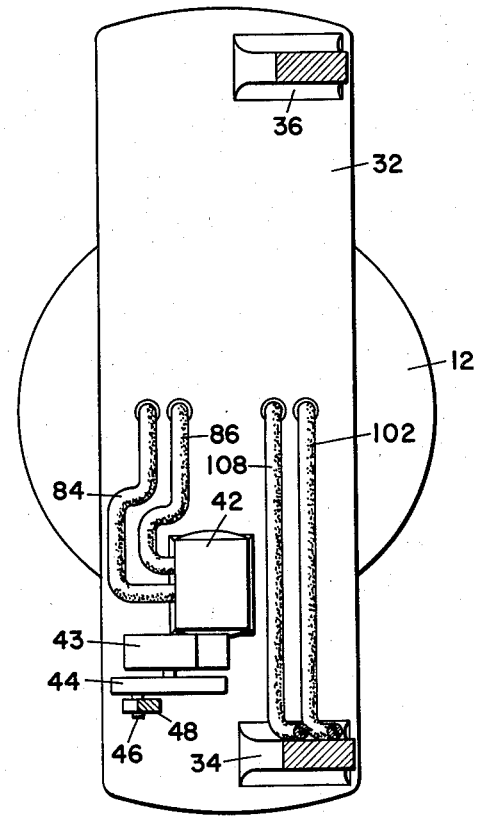
FIGURE 4 represents a plan view of the apparatus of FIGURE 3 taken in section along line 4—4 thereof.

Referring next to FIGURES 3 and 4, the stabilized element of a stable radar antenna mounting is designated 10. This mounting may be considered of a kind found either in an aircraft or a marine vessel. By means of this mounting, element 10 and all structure supported upon it and within it are maintained in substantially continuous horizontal stability without regard, within limits, to pitch and roll of the aircraft or marine vessel.

Antenna turntable 12 is supported by ball rollers 14 on the upper surface of an upper flange of stabilized element 10. Azimuth drive shaft 16 is centrally and fixedly located in turntable 12, and extends downwardly therefrom. Below turntable 12 and within stabilized element 10, anti-upsetting plate 18 is fixedly and concentrically mounted on drive shaft 16. Plate 18 is spaced off from the lower surface of the upper flange of stabilized element 10 by ball rollers 20. At its lower end, drive shaft 16 is fixedly fitted with azimuth drive gear 22. This gear is meshed with pinion 24 on the output shaft of azimuth drive motor 26 which is in turn mounted on the interior wall surface of stabilized element 10. Motor 26 may be taken as a direct current device having armature current supplied through cable 28 and field current through cable 30 from a source or sources not shown. These cables coming in through insulated holes in element 10 will have a certain degree of flexibility in them to allow for motion of the stabilized element with respect to the power source located elsewhere in the aircraft or vessel.

Extending across turntable 12 and fixedly supported thereon is the antenna base plate 32. Mounted upon and extending upwardly from this base plate are the antenna support stanchions 34 and 36. At their upper ends these stanchions are provided with bearings to receive shaft elements or trunnions 38 extending from antenna reflector 40, and which support this reflector and other pulse transmitting and receiving apparatus intended to be wobbled through the extent in elevation of the scan. Wobbling of the antenna is effected by elevation drive motor 42 which is mounted on base plate 32. This motor which has a speed reducing gear head 43 drives crank plate 44 which retains crank pin 46. Pivoted on this pin is the lower end of connecting rod 48. The upper end of this rod is pivoted on pin 50 retained in crank member 52. This latter crank member is fixedly attached to shaft element 38 in the extent of this shaft between stanchion 34 and reflector 40. By means of this crank and connecting rod mechanism the reflector and other antenna elements may be wobbled through an arc of, for example, 60°, distributed 45° above and 15° below the horizontal.

Because of the compound nature of the motion imposed on the antenna, a number of electrical connections in the apparatus of FIGURES 3 and 4 must be made through brushes and slip rings. Nine slip rings are shown altogether. These are designated 54, 56, 58, 60, 62, 64, 66, 68, and 70. All nine of these rings are set on and in an insulating shell 72 which is in turn tightly fitted onto a metal shell 74 which acts as a stiffener. The metal shell is in turn fitted on and attached to a sleeve-like downward extension of anti-upsetting plate 18. There is an opening through shells 72 and 74 and, where necessary, through the sleeve of plate 18 on the level of each slip ring, and through these openings, which will themselves each be provided with an insulating bushing liner extending at least through the metal-bounded part thereof, wire connections may be made to the slip rings from the inside.

Slip rings 54, 56, 58, and 60 serve the elevation drive motor 42 which is here taken as a direct current device. Wires 76 and 78 passing through insulation-lined holes in stabilized element 10 terminate in brushes bearing on rings 54 and 56 to supply armature current. Wires 80 and 82 have similar brush contact with rings 58 and 60 to furnish field current to the elevation drive motor. The armature current take-offs from rings 54 and 56 are joined in cable 84, while those for field current from rings 58 and 60 are joined in cable 86.

Information regarding position of the antenna in azimuth and elevation is transmitted by synchro generators. The azimuth synchro generator is designated 88, and the elevation synchro generator is designated 90. Generator 88 is mounted on the interior wall surface of stabilized element 10. On its input shaft it carries a gear 92 which meshes with and has the same number of teeth as azimuth drive gear 22. The motion of azimuth drive shaft 16 and hence the motion in azimuth of the antenna with respect to stabilized element 10 will thus be reproduced exactly as motion of the shaft of generator 88. Generator 90 is mounted on antenna support stanchion 34. On its input shaft it carries a bevel gear 94 which meshes with and has the same number of teeth as bevel gear 96 which is fixedly mounted on a segment of reflector shaft 38 extending beyond the shaft bearing in stanchion 34. The motion of the antenna in elevation with respect to base plate 32 will thus be reproduced exactly as motion of the shaft of generator 90. Since base plate 32 is maintained continuously in a substantially horizontal plane by stabilized element 10, motion of the antenna in elevation with respect to the earth's surface will also be reproduced faithfully as motion of the shaft of generator 90.

Basically, synchro generators 88 and 90 each comprise a simple rotor coil and a Y-connected stator coil. The rotor coil of each is energized from an external source of alternating current, and with respect to this source is connected in parallel with the rotor coil of a synchro motor. Considering azimuth synchro generator 88, alternating current for its rotor coil is supplied through cable 98 which passes in through an insulated hole in stabilized element 10. The three leads from the terminals of the stator of generator 88 pass out as cable 100 through another insulated hole in the stabilized element.

Considering elevation synchro generator 90, alternating current for its rotor coil is supplied through cable 102 which comprises the take-off leads from slip rings 62 and 64, and extends up through turntable 12 and base plate 32, part way across base plate 12 to stanchion 34, and up along stanchion 34 to the generator. Rings 62 and 64 are fed in turn by wires 104 and 106 coming from an external power source, passing through insulated holes in stabilized element 10, and terminating in brushes bearing on the rings. Connection to the stator coil of generator 90 is made by three leads which cable 108 comprises. This cable extends from the generator down along stanchion 34 to base plate 32, part way across plate 32, and then down through this plate and turntable 12. At their lower ends the leads of this cable are fixedly joined to slip rings 66, 68, and 70. Brushes running on these rings will pick up any electrical signal coming down through cable 108, and this signal will be transmitted along wires 110, 112, and 114 extending from the brushes out through insulated holes in stabilized element 10.

Concluding this detailed description of FIGURES 3 and 4, reference is made to the preceding short description of these figures in which it was said that they represented views of a radar antenna and mechanical-electrical supporting, operating, and position transmitting apparatus therefor, adapted for helical scanning. Significantly, no mention was made of a representation of any coaxial lines or wave guides or other antenna elements particularly associated with its pulse transmitting and receiving function. This was because the present invention will be shown to be associated primarily with only that apparatus recited. Dipole elements 116 and 118 appearing without feeding means in FIGURE 3, and shown without numerical designation in FIGURE 2, are only intended to characterize the antenna representations therein most generally, and do not constitute limitations upon the present invention.

Referring next to FIGURE 5, at least some of the equipment shown therein will have to be located in or close by the navigating or piloting space of the aircraft or marine vessel to which the present invention is applied, and all of it is likely to be so located. The reasons for such location will become apparent in the further course of this disclosure.

For purposes of the present invention it is desired to generate signals of true rather than merely relative azimuth of targets. This is effected by means of the differential synchro generator 120 which includes a rotor 122 and a stator 124, each comprising three coils joined in Y. Rotor 122 has an input shaft 126 through which it is driven by gyrocompass 128. Stator 124 is energized from the stator of azimuth synchro generator 88 through the three leads which cable 100 comprises. This cable may be brought by any convenient path from the antenna mount of FIGURES 3 and 4 to connect with the differential synchro generator.

Cable 98 comprising the two leads for the rotor coil of the azimuth synchro generator is also brought from the antenna mount to the apparatus of FIGURE 5. These leads and those from Y-connected rotor 122 of differential synchro generator 120 are joined respectively to rotor and stator elements of synchro motor 130 which includes a single rotor coil 132 and a stator 134 comprising three coils joined in Y. Rotor coil 132 and the rotor coil of the azimuth synchro generator are both supplied with alternating current from a common source across terminals $T_1$ and $T_2$. The angular position assumed by rotor 132 will correspond to the sum of the displacement of the rotor of generator 88 which is the azimuth of the radar antenna relative to the aircraft or vessel and the compass course, assumed to be true, indicated by gyrocompass 126. This angular position will, therefore, represent the true azimuth of the antenna, and, when echo signals are being received, the true azimuth of targets.

Synchro motor 130 is provided with an output shaft 136 whereby it is connected to an electrical pulse distributor 138. This distributor comprises an armature 140 mounted on shaft 136, thirty-six electrical contact blocks such as 142, and a holder ring 144 of electrically insulating material concentric with shaft 136 and carrying blocks 142 in circumferential array wherein they may be borne upon sequentially by armature 140. The contact blocks may be uniform in design, being, for example, of arcuate form and 9° in angular width with respect to holder ring 144. On the basis of even distribution around ring 144, contact blocks 142 will have a block-to-block spacing of 1°.

It is contemplated that the disposition of blocks 142 with respect to the other mechanism of this invention and to the aircraft or marine vessel to which this invention is applied will be such that these blocks will correspond to arcs of azimuth as follows: 000.5° to 009.5°, 010.5° to 019.5°, 020.5° to 029.5°, . . ., and 350.5° to 359.5°. The width of armature 140 in its region of contact with blocks 142 may be defined according to the beam width in azimuth of signals transmited from the radar antenna. For example, if this beam width be 5° the width of armature 140 with respect to the contact blocks may be 5° also. Accordingly it will be possible for the armature to bear upon two contact blocks simultaneously in certain of its positions.

Each contact block 142 is connected to a charging circuit 146; that is, there are thirty-six separate charging circuits 146, each one connected to a separate contact block 142. These thirty-six circuits may be of identical configuration with corresponding elements in each having identical electrical values. The exemplary circuit shown in FIGURE 5 comprises a rectifier 148, a glow discharge tube 150, a capacitor $C_1$, a push button switch 152 for shorting the capacitor, and resistors $R_1$, $R_2$, $R_3$, and $R_4$. The action of this charging circuit will be discussed presently.

Appearing as elements of FIGURE 5 are the video amplifier and cathode follower of a radar receiver such as the typical receiver shown in FIGURE 2. There will be a signal from the video amplifier to the cathode follower only when echo pulses from a target are being picked up by the radar antenna. During this pick-up time the video amplifier output will consist of a series of positive voltage pulses. A typical pulse repetition frequency would be 800 pulses per second, that is, one pulse every 1,250 microseconds. Pulses of 2 microseconds duration, for example, will be sent out continuously from the transmitter at this rate. When echo signals are picked up and there is an output from the video amplifier, its output pulse rate will be 800 per second likewise.

Besides constituting the input to the cathode follower, the output pulses of the video amplifier may be directed to a one-shot multivibrator here designated 154 which is of a kind adapted to be triggered by a positive pulse. $T_3$ is the input terminal of multivibrator 154 for pulses from the video amplifier; $T_4$ is the terminal whereby a steady positive potential of $V_b$ volts is imposed on the plate circuit of the multivibrator from the power supply of the radar system of FIGURE 1, and $T_5$ is the output terminal of multivibrator 154. The cathode follower, itself having a positive pulse output and serving to match impedance from the video amplifier to the indicators, may be used instead of the video amplifier to trigger the multivibrator if for any reason it should be more convenient to take the trigger signal from the cathode follower rather than from the video amplifier.

In its quiescent condition, that is, in the absence of a triggering pulse from the video amplifier, multivibrator 154 will have a steady positive output potential. By selection of system components of appropriate electrical values, this output potential may be, for example, +90 volts. When the multivibrator is triggered by a video amplifier output pulse, its own output potential will rise abruptly to some value greater than +90 volts, but less than $V_b$. This is taking into account the fact that when the output potential of multivibrator 154 rises above +90 volts there will be a flow of current to charging circuit 146 according to the preferred practice of this invention as will be shown presently.

The value to which the output potential of the multivibrator rises in response to a triggering signal may be taken as +300 volts. Output potential of circuit 154 will continue at this value for a while, and then drop back abruptly to +90 volts and there remain until the arrival of another triggering pulse at $T_3$. The output voltage of multivibrator 154 as available at $T_5$ will thus be a series of positive square waves of 210 volts amplitude superimposed on a basic output of +90 volts.

The components of the multivibrator circuit may be selected for a desired duration of the output pulses therefrom. They may be chosen, for example, to provide a pulse duration of very nearly 1,250 microseconds. With such a choice the output potential of multivibrator 154 at terminal $T_5$ will be a substantially steady +300 volts for as long as there is an actual pulse output rate from the video amplifier of 800 per second.

Terminal $T_5$ serves as one input terminal of a potentiometer 156 which comprises resistor $R_5$ and slider 158. The other input terminal $T_6$ has imposed upon it a steady negative potential of 300 volts from the power supply shown in FIGURE 1. When multivibrator 154 is quiescent, therefore, the potential of resistor $R_5$ varies from 90 volts positive at one end to 300 volts negative at the other. When the multivibrator is triggered by the video amplifier, however, the voltage distribution along $R_5$ will be from 300 volts positive to 300 volts negative.

Depending upon its position along resistor $R_5$, potentiometer slider 158 may tap off any voltage in the ranges indicated (+90 to −300 or +300 to −300), and make this voltage available at potentiometer output terminal $T_7$. The voltage which is available at the terminal for a given setting of slider 158 will be indicated by voltmeter 160. A setting of slider 158 of particular interest for purposes of this disclosure is that one which will provide a zero voltage at $T_7$ when multivibrator 154 is quiescent; that is, when the potential drop across $R_5$ is from +90 volts to −300 volts. When the multivibrator is triggered and $T_5$ achieves a potential of +300 volts, slider 158 having been left undisturbed, the potential of $T_7$ will rise to approximately +160 volts. Thus while there is a pulse output from the video amplifier with consequent triggering of multivibrator 154; that is, when echoes are being picked up from a target, $T_7$ will be at a substantially steady potential of +160 volts. On the other hand, when there are no target echoes reaching the antenna the potential at $T_7$ will be substantially zero.

Terminal $T_7$ is connected electrically to the hub of armature 140, and thus serves as the input terminal for pulse distributor 138. Therefore, as the potential at $T_7$ increases suddenly from 0 volts to +160 volts upon receipt of an echo signal from a target a substantially steady potential of +160 volts will be impressed upon whichever contact block or blocks 142 are borne upon at that time by armature 140, and, correspondingly, upon the charging circuit or circuits 146 connected to these blocks.

A general consideration in design of charging circuit 146, multivibrator 154, and potentiometer 156 is that the variation in current drawn by the charging circuit, this current being the sum of currents in $R_1$ and $R_3$, over any range of conditions of the latter circuit when the potential of terminal $T_5$ is at its upper value be quite small in comparison with the current flowing in resistor $R_5$ between terminal $T_5$ and the point of contact of slider 158. This is for the purpose of achieving a very nearly constant value of charging potential at terminal $T_7$, a constant +160 volts in this case.

For purposes of example, suppose that motor 26 drives the radar antenna at the rate of 20 revolutions per minute or 1 revolution every 3 seconds. This will represent the mean rate of angular motion of armature 140. Suppose further that not more than ten contacts of armature 140 with a block 142 are required to ignite the glow discharge tube 150 of the charging circuit connected to the block, the armature being energized due to receipt of echo signals from a target on a particular true azimuth. This is taken as the criterion of a constant true azimuth situation having collision possibilities inherent therein. With contact blocks 9° wide, an armature 5° wide, and a beam width in azimuth of 5°, the least contact time of the energized armature upon the appropriate block 142 for any target pick-up during one revolution of the radar antenna will be 0.038 sec. $(4.5(\frac{1}{120})=0.038)$. This will be the charging time per revolution of the antenna. The discharging or decay time intermediate charging impulses will be 2.962 sec. $(3.00-0.038=2.962)$.

There will be some voltage drop across rectifier 148, a device comprising a thin film of copper oxide on a copper plate or a selenium on an iron plate, for example, but this may be taken as negligibly small. An effective charging potential of substantially +160 volts will be available across the series combination of resistor $R_1$ and capacitor $C_1$, which together are in parallel with resistor $R_3$. Actual charging of capacitor $C_1$ is effected through resistor $R_1$. During the 2.962 sec. interval between charging contacts there will be a decay of charge by flow of current in the series circuit comprising capacitor $C_1$ and resistors $R_1$ and $R_3$. Resistor $R_3$ is unnecessary for charging, and is in fact a detriment to this process as it provides a discharge path. In the overall design, however, it is necessary that this discharge path exist for charge accumulations on capacitor $C_1$ which are insufficient to ignite tube 150, for example such charge as might accumulate if a target were picked up on the same true azimuth for fewer than 10 consecutive revolutions of the radar antenna.

For the conditions of charging voltage and antenna rotational speed supposed already, a potential of approximately 90 volts will be achieved on capacitor $C_1$ in ten revolutions of the antenna with a target on a constant true bearing (within the 10° span of a given contact block 142 and an adjacent interval of insulation) for the following values of circuit elements: $R_1=2\times10^3$ ohms; $R_3=10^6$ ohms; and $C_1=0.2\times10^{-3}$ farads. A potential of 90 volts will be sufficient to ignite the glow discharge tube 150 if this be a Type #991 Vacuum Tube (Neon Bulb). Such a tube or bulb has the following characteristics: diameter=⅝"; length 1 9/16"; base is of bayonet candelabra double contact design; ionizing voltage (starting supply)=77 to 87 volts; peak current (alternating or pulse) =3.0 ma.; peak current (direct)=2.0 ma.; operating voltage=62.5 volts at 2.0 ma. direct current, and deionizing voltage=48 to 50 volts at 0.4 ma. direct current. Use of a Type #991 Vacuum Tube (Neon Bulb) as glow discharge tube 150 will be supposed for purposes of example.

Tube 150 will need to have a current-limiting resistor connected in series with it. This resistor is here designated $R_2$. It is desired that once a given tube 150 has been ignited it will stay lit or continue to glow for as long as charging pulses are applied to the particular contact block to which its circuit 146 is connected for consecutive revolutions of armature 140; that is, the values of circuit elements in the discharge paths which will now exist both through resistor $R_3$ and tube 150 itself should not let the potential across the tube drop below the deionizing potential in the 2.962 sec. interval between charge applications on the contact block. Correspondingly it is desired that the tube deionize or be extinguished if there be an interruption of charging pulses to its contact block. In respect of values of other circuit elements established already, these conditions will be satisfied if $R_2 = 85 \times 10^3$ ohms.

It has been noted already that with armature 140 being 5° wide and contact blocks 142 being spaced by 1° along holder ring 144 it will be possible for the armature to bear upon two blocks simultaneously. Rectifier 148 is provided in each charging circuit to prevent any backflow of current in such a circumstance from a charged circuit to one which is relatively less charged. Of course if a target should be picked up on a bearing which corresponds precisely to the mid-point of the interval between two adjacent blocks 142, there will be equal charging of two circuits which will result in the igniting of two tubes or neon bulbs 150 if continued for 10 consecutive revolutions of armature 140.

For checking purposes it may be desirable to discharge capacitor $C_1$ completely and abruptly, that is, in less time than it would take the capacitor charge to decay through the circuit comprising $R_3$. To this end a push button shorting switch 152 and a resistor $R_4$ in series therewith are provided across the capacitor. This switch is, of course, normally open. The ohmic value of resistor $R_4$ may be relatively small, being large enough only to prevent an unduly high current surge when switch 152 is closed. Tubes or neon bulbs 150 will desirably be disposed around the face of a cathode ray tube intended to give a type P presentation as will be shown in FIGURE 7. The push buttons for the shorting switches 152 of the several charging circuits 146 may also be disposed around the tube face, each button being closely adjacent the tube 150 of its own circuit. In another arrangement the shorting switch push buttons may all be brought out to a separate console or panel where they may be manipulated easily by the pilot or navigator. It is obvious that pairs of leads may be brought out also across each individual shorting switch to a master shorting switch whereby all capacitors $C_1$ may be discharged to ground at once.

The remaining control device shown in FIGURE 5 which should be located for convenient manipulation by the pilot or navigator is slider 158 of potentiometer 156. It is by means of this slider that the voltage available at terminal $T_7$, the input terminal of distributor 138, is regulated. While values of 0 volts and +160 volts at $T_7$ have been indicated, and charging circuit element values calculated with these voltage conditions as parameters, circuit operating conditions may vary slightly. By providing for some degree of adjustment of voltage conditions at $T_7$, compensation for such variation may be made to maintain desired conditions of charging of circuit 146 and firing of tube 150. It is to be understood that the capacitor and the several resistors of circuit 146 may be made variable also, but it is contemplated that the design of the circuit may be sufficiently precise that elements of substantially fixed electrical value and therefore simple construction may be employed therein. As well as slider 158 being conveniently manipulatable, the face of voltmeter 160 will of course be easily visible.

Figure 6:
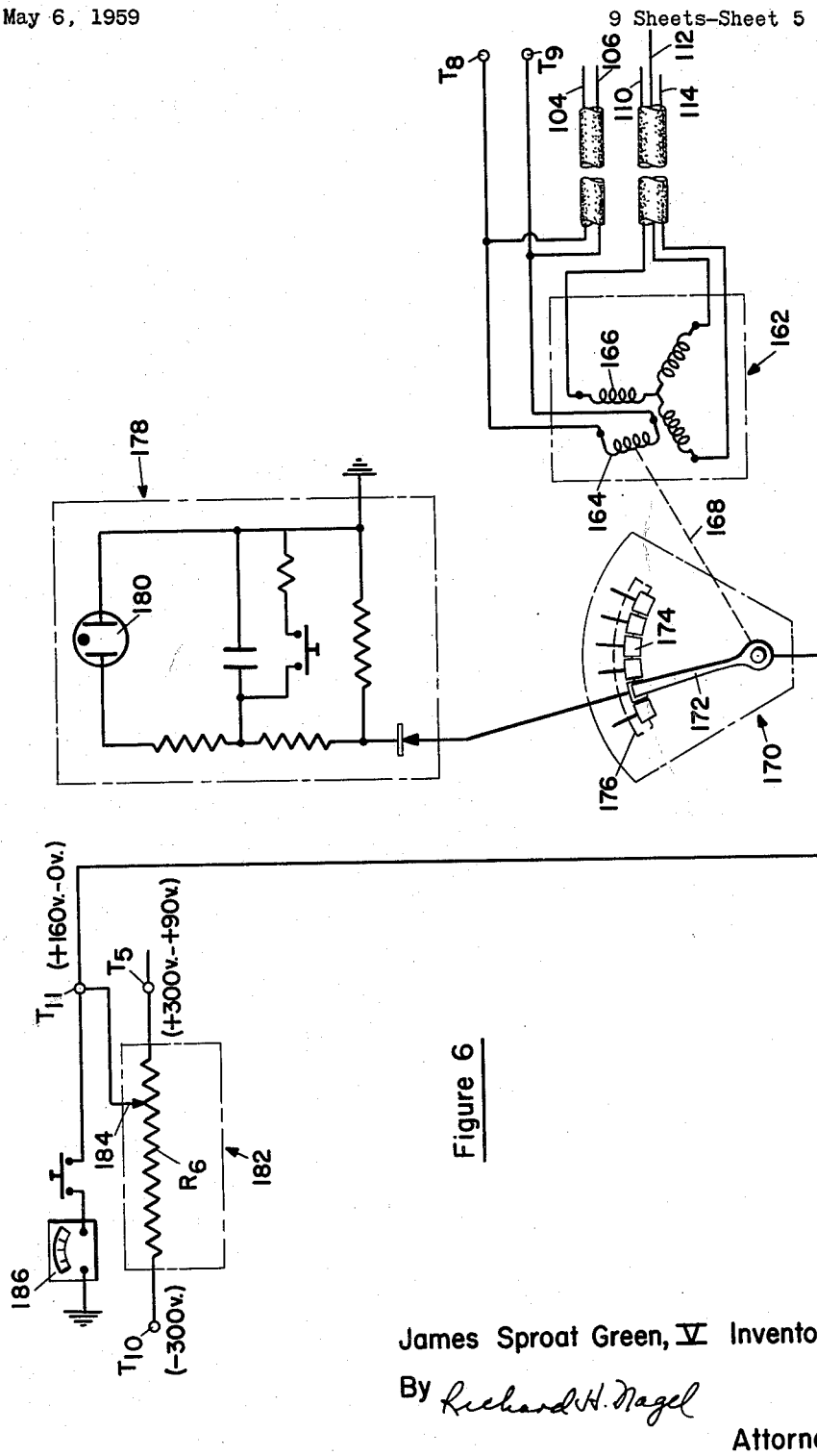
FIGURE 6 represents a schematic diagram of an echo pulse distributor adapted to cooperate with a type E presentation of data from the antenna of FIGURES 3 and 4, and a representative constant elevation warning lamp charging circuit associated therewith according to this invention.

Referring next to FIGURE 6, at least some of the equipment shown therein will, like that of FIGURE 5, have to be located in or close by the navigating or piloting space of the aircraft or marine vessel to which the present invention is applied. In general, the apparatus of FIGURE 6 provides glow discharge tube signals responsive to targets on a constant true elevation corresponding to those provided by the apparatus of FIGURE 5 responsive to targets on a constant true azimuth.

Since antenna base plate 32 is considered substantially stabilized in a horizontal plane, electrical signals transmitted by elevation synchro generator 90 will correspond to true elevation of the radar antenna. For this reason the apparatus of FIGURE 6 need not include a differential synchro generator such as 120 in the apparatus of FIGURE 5. Instead, the rotor leads 104 and 106 and stator leads 110, 112, and 114 from generator 90 will be taken away by any convenient paths directly to synchro generator 162 which includes a single rotor coil 164 and a stator 166 comprising three coils joined in Y. Rotor coil 164 and the rotor coil of the elevation synchro generator are both supplied with alternating current from a common source across terminals $T_8$ and $T_9$. For simplicity, these terminals may coincide with terminals $T_1$ and $T_2$ of FIGURE 5. According to reasons afore-stated, the angular position assumed by rotor 164 will represent the true elevation of the radar antenna, and, when echo signals are being received, the true elevation of targets.

Synchro motor 162 is provided with an output shaft 168 whereby it is connected to an electrical pulse distributor 170. This distributor comprises an armature 172 mounted on shaft 168, six electrical contact blocks such as 174, and a holder arc 176 of electrical insulating material concentric with shaft 168 and carrying blocks 174 in circumferential array wherein they may be borne upon sequentially by armature 172. It is contemplated that the disposition of blocks 174 with respect to the other mechanisms of this invention and to the aircraft or marine vessel to which this invention is applied will be such that these blocks will correspond to arcs of elevation as follows: −15.0° to −05.5°, −04.5° to +04.5°, +05.0° to +14.5°, + 15.5° to +24.5°, +25.5° to +34.5°, and +35.5° to +45.0°. The width of armature 172 in its region of contact with blocks 174 may be defined according to the beam depth in elevation of signals transmitted from the radar antenna. For example, if this beam depth be 5° the width of armature 172 with respect to the contact blocks may be 5° also. Accordingly it will be possible for the armature to bear upon two contact blocks simultaneously in certain of its positions.

Each contact block 174 is connected to a charging circuit 178; that is, there are six separate charging circuits 178, each one connected to a separate contact block 174. These six circuits may be of identical configuration both with respect to each other and with respect to charging circuits 146 of the apparatus of FIGURE 5. They may each employ a Type #991 Vacuum Tube (Neon Bulb) 180. Values of other circuit elements, however, will have to be calculated on the basis of the wobble rate of the antenna in elevation, and may differ from circuit to circuit because of angularity considerations inherent in the nature of the elevation drive. The methods of calculation of circuit element values for all cases, however, will be those well known in the electrical art.

Multivibrator circuit 154 shown in FIGURE 5 may be used with an apparatus to provide glow discharge tube signals responsive to targets on a constant true elevation as well as with one to provide such signals responsive to targets on a constant true azimuth. Accordingly terminal $T_5$, the output terminal of multivibrator 154, appears in FIGURE 6, and, as in FIGURE 5, is indicated as varying in potential between +90 volts and +300 volts. Terminal $T_5$ serves as one terminal of a potentiometer 182 which comprises a resistor $R_6$ and a slider 184. The other input terminal $T_{10}$, which may for simplicity coincide with terminal $T_6$ of FIGURE 5, has imposed upon it a steady negative potential of 300 volts from the power supply shown in FIGURE 1. The output terminal $T_{11}$ of potentiometer 180 will be at a voltage which is dependent upon the setting of slider 184 on resistor $R_6$. For purposes of example this slider may be assumed to be set to maintain $T_{11}$ at 0 volts when $T_5$ is at +90 volts, and at +160 volts when $T_5$ is at +300 volts. A voltmeter 186 is provided for determining the potential at $T_{11}$, and as an aid in setting slider 184.

Terminal $T_{11}$ is connected electrically to the hub of armature 172, and thus serves as the input terminal for pulse distributor 170. Therefore, as the potential at $T_{11}$ increases suddenly from 0 volts to +160 volts upon receipt of an echo signal from a target a substantially steady potential of +160 volts will be impressed upon whichever contact block or blocks 174 are borne upon by armature 172, and correspondingly, upon the charging circuit or circuits 178 connected to these blocks. It is apparent that the apparatus of FIGURE 6 might commence on one side not with terminal $T_5$ but rather with terminal $T_7$, and thus potentiometer 156 serve the elevation as well as the azimuth charging circuits. To provide each system with some individual degree of adjustment, however, it is considered preferable that the elevation charging circuits have their own potentiometer 182 and voltmeter 186 as shown in FIGURE 6.

A general consideration in design of charging circuit 178, multivibrator 154, and potentiometer 182 is that the variation in current drawn by the charging circuit over any range of conditions of the latter circuit when the potential of terminal $T_5$ is at its upper value be quite small in comparison with the current flowing in resistor $R_6$ between terminal $T_5$ and the point of contact of slider 184. This is for the purpose of achieving a very nearly constant value of charging potential at terminal $T_{11}$, a constant +160 volts in this case. This corresponds to a consideration mentioned in connection with the apparatus of FIGURE 5, and in the design of the complete embodiment of the present invention as here disclosed these two considerations must be taken together.

Figure 7:
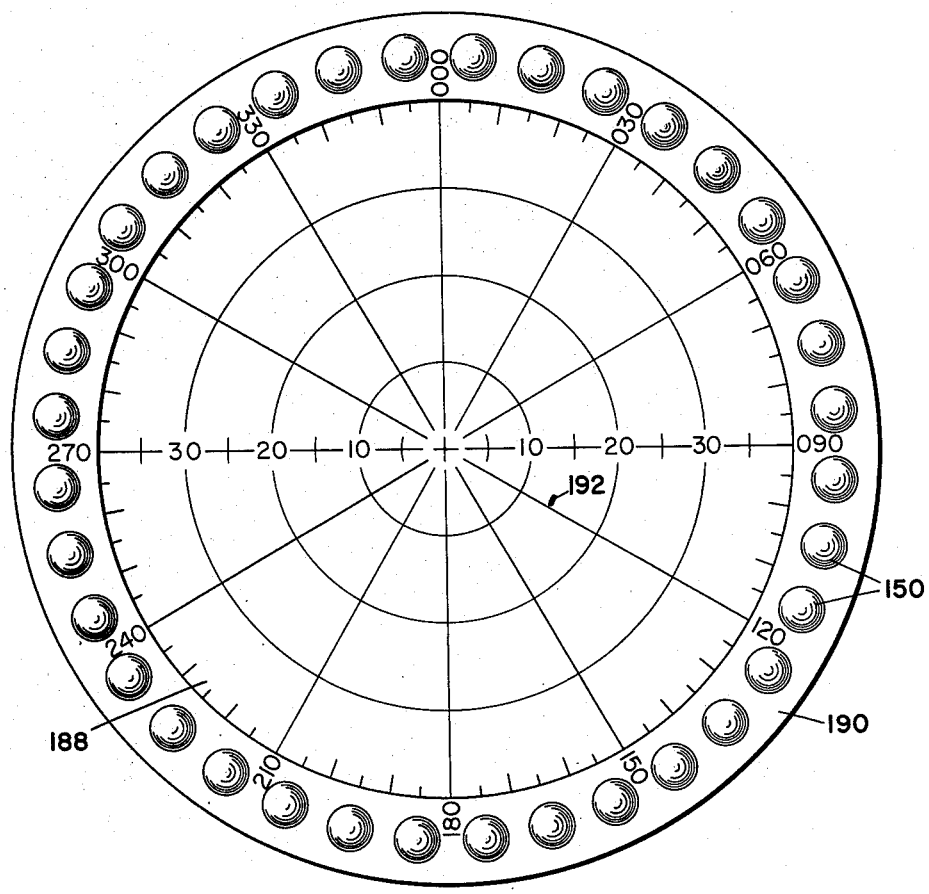
FIGURE 7 represents the face of a cathode ray tube adapted for a type P presentation of data and provided with constant azimuth warning lamps according to this invention.

Referring next to FIGURE 7, the face of a cathode ray tube 188 adapted for type P presentation is shown enclosed by a frame 190. This frame is perforated to reveal the ends of glow discharge tubes 150 which are arrayed around the cathode ray tube face corresponding with 10° intervals of bearing as follows: 000° to 010°, 010° to 020°, 020° to 030, . . . , and 350° to 360° (000°). The tube face is graduated in range up to 40 miles, and a luminous spot 192 representing a target is indicated at 117° and 14 miles. Target presentation is assumed to be according to true values of azimuth.

Figure 8:
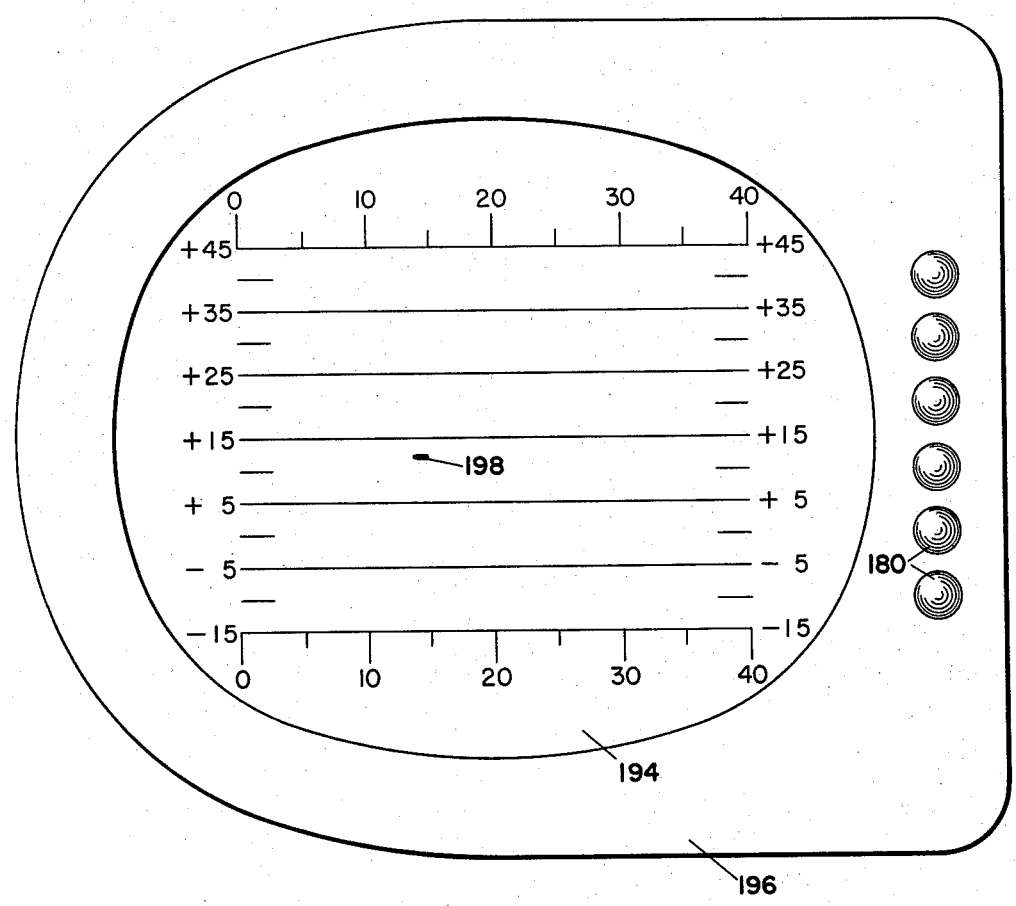
FIGURE 8 represents the face of a cathode ray tube adapted for a type E presentation of data and provided with constant elevation warning lamps according to this invention.

Referring next to FIGURE 8, the face of a cathode ray tube 194 adapted for type E presentation is shown enclosed by a frame 196. This frame is perforated to reveal the ends of glow discharge tubes 180 which are arrayed alongside the cathode ray tube face corresponding with 10° intervals of elevation as follows: −15° to −05°, −05° to +05°, . . ., and +35° to +45°. The tube face is graduated in range up to 40 miles, and a luminous spot 198 representing a target is indicated at +12° and 14 miles. Target presentation is assumed to be according to true values of elevation.

Figure 9:
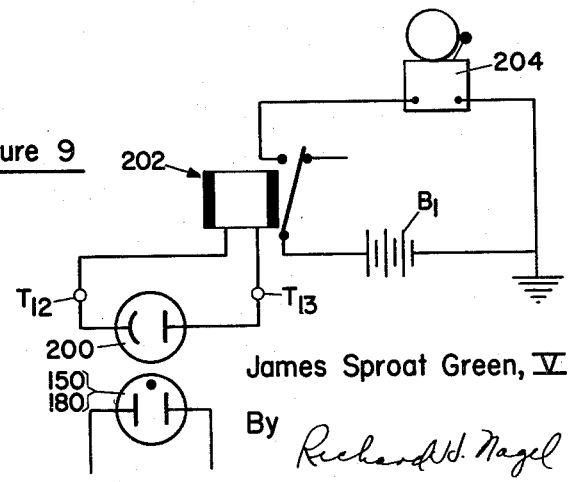
FIGURE 9 represents a schematic diagram of an audible alarm system adapted to cooperate with the warning lamp charging circuits of FIGURES 5 and 6.

Referring next to FIGURE 9, a photoelectric cell 200 is disposed closely adjacent a glow discharge tube which may be either tube 150 of a representative charging circuit 146 of FIGURE 5 or tube 180 of a representative charging circuit 178 of FIGURE 6. The disposition of cell 200 with respect to the glow discharge tube is such that the active face of the cell will be illuminated when the tube is ignited to generate a voltage across cell terminals $T_{12}$ and $T_{13}$, and energize the coil element of relay 202.

In its external circuit relay 202 has a voltage source such as battery $B_1$ and a sonic device such as bell 204. When the relay is energized as by a voltage from cell 200 it will act to close its external circuit. When this is done, battery $B_1$ will cause ringing of bell 204. By the arrangement of FIGURE 9, which may be reproduced for all thirty-six glow discharge tubes 150 of azimuth charging circuits 146 and all six glow tubes 180 of elevation charging circuits 178, audible alarm will be given of a target which remains in a 10° interval of constant true azimuth or constant true elevation for longer than a prescribed period of time. It may be desirable to use bells of different tones for azimuth and elevation circuits. It is to be understood, of course, that voltage amplifying means of a kind well known in the electronic art may be provided in the circuit of photoelectric cell 200.

To consider the operation of the present invention in terms of a specific example, take the target situations illustrated in FIGURES 7 and 8. Suppose that target 192 remains in a given interval of true azimuth long enough to cause ignition of a tube 150, and that target 198 remains in a given interval of true elevation long enough to cause ignition of a tube 180. These tube ignitions will cause ringing of bells 204 assuming installation of the audible alarm system.

One way or another, however, by either visibly glowing tubes, ringing bells, or both, the attention of the person responsible for the navigation or piloting of the aircraft or marine vessel will be brought to the visual type P and E indicators of his radar system. He will notice targets 192 and 198 which, because of identity of range are very likely a single target in fact. This identity will be confirmed if no other targets show up at 14 miles for azimuths other than 117° and elevations other than +12°. The navigator-observer will notice also whether the target (assuming it a single one) is actually on a constant true azimuth and elevation or is moving slowly across a given 10° interval in one angular coordinate or the other or both. Having identified the target and its possibly dangerous situation of constant true azimuth and constant true elevation (it will be an actually dangerous situation, at least prospectively, if target azimuth and elevation are both in fact constant and target range be shortening), the observer may take such steps as he deems appropriate to terminate the danger.

The anti-collision detection and warning system of this invention having been described with reference to the operation of the illustrated apparatus embodiment thereof, a generally applicable comment about the design of this apparatus will be made, and certain alternate forms of its structure will be described.

In addition to pickup echoes from solid targets such as ships or aircraft, the antenna of a radar system of the general kind contemplated by this invention will continuously be getting echoes of a low order which are commonly known as "sea return." When applied to a cathode ray indicator these echoes show up as an image called "grass." Obviously it is not desired that energizing pulses be applied to charging circuits 146 and 178 simply because of sea return. Were this to happen, all of the azimuth glow lamps 150 and at least some of the elevation glow lamps 180 might be ignited continuously, and the apparatus thus be incapable of giving distinct visual or audible warning of solid targets on collision courses with the observer's own craft. This situation may be avoided by so designing multivibrator circuit 154 that output pulses from the video amplifier or cathode follower having a magnitude corresponding to echoes from aircraft, marine vessels, or land masses within reasonable scanning distance will be sufficient to trigger the multivibrator, but those having a magnitude corresponding only to sea return will not.

The audible warning system of FIGURE 9 has been shown with a bell 204 in a photoelectric cell circuit which is not a physical part of the circuit containing the glow discharge tube. It would obviously be possible to dispense with photoelectric cell 200, relay 202, and battery $B_1$, by installing a bell 204 directly in each charging circuit 146 and 178 between the glow discharge tube and ground. There would be a flow of current through this bell and hence there would be ringing of it only when the tube was ignited; that is, only when a target was picked up on an unchanging azimuth or elevation for a predetermined period of time. An exemplary glow discharge tube charging circuit 146′ including a bell 204 in series with its tube 150 is shown in FIGURE 10. In an even more simple arrangement, a single bell could be used for all of the azimuth charging circuits 146 by providing these thirty-six circuits with a common ground line and installing the bell in this line. A similar arrangement using a single bell could be made for all of the elevation charging circuits 178. An exemplary plurality of glow discharge tube charging circuits 146 connected to a common ground line including a bell 204 with this bell in series with the tube 150 of each of the circuits is shown in FIGURE 11.

The radar antenna mount shown in FIGURES 3 and 4 has been assumed as substantially stabilized in the horizontal plane. Even if it be not so stabilized, however, this invention will not be defeated. For the case of a non-stabilized mount, the elevation synchro generator 90, like the azimuth synchro generator 88, may be connected to transmit to a differential synchro generator. The differential synchro generator for elevation signals will take a mechanical input from the stable element locally associated with gyrocompass 128. This mechanical input will be the rotation of a shaft similar to shaft 126 through an angle representing displacement from the true horizontal of a reference plane on the observer's own aircraft or marine vessel.

In the electrical apparatus shown in FIGURES 5 and 6, all of the charging current for azimuth and elevation circuits 146 and 178 is drawn from the multivibrator circuit 154. Even when no one of the circuits 146 or 178 is being charged, there will be a continuous drawing of current from the multivibrator through potentiometer resistors $R_5$ and $R_6$. This current requirement might be reduced by replacing potentiometers 156 and 182 each with an electro-mechanical relay generally similar to relay 202 appearing in FIGURE 9.

Considering this replacement in the apparatus of FIGURE 5, to which that in the apparatus of FIGURE 6 would be altogether similar, one of the switch or external circuit terminals of the relay substituted for potentiometer 156 would be connected to the hub of armature 140 thus becoming the equivalent of $T_7$. The other relay switch terminal would be connected to a potential source, preferably one of at least +160 volts and having a rheostat control so that the adjustability feature associated with potentiometer slider 158 will be retained. One side of the coil element of the relay would be connected to $T_5$, the output terminal of the multivibrator, and the other would go to ground. An exemplary arrangement of the kind described is shown in FIGURE 12 wherein an electromechanical relay 206 controlling the application of voltage at about +160 volts from a regulated external terminal or source $T_{14}$ to the hub of armature 140 of pulse distributor 138 has been substituted for potentiometer 156 and negative voltage source $T_6$ in the apparatus of FIGURE 5.

With this arrangement the maximum current needed to be drawn from the multivibrator would be only that required to close the switch terminals of the azimuth and elevation relays, allowing about +160 volts to be applied to the hubs of armatures 140 and 172 and from there to charging circuits 146 and 178. The relays would be so selected that their switch terminals would not be closed by application to their coils of the lower output voltage of the multivibrator (+90 volts), but would be closed when the upper output voltage (+300 volts) was applied thereto; that is, when multivibrator 154 was triggered by an input pulse from the video amplifier or cathode follower corresponding to an echo received by the radar antenna from a substantial target.

The practical as well as theoretical possibility of using relays in the way and for the purpose described is apparent in view of the fact that relays may be built to have an operating time as low as about .001 sec. Such an operating time is very small compared to a period of .038 sec., the least contact time of the energized armature 140 upon the appropriate contact block 142 for any target pick-up during one revolution of the radar antenna.

Another variation of the electrical apparatus shown in FIGURES 5 and 6 to avoid drawing charging currents through the multivibrator would be achieved by utilizing potentiometers 156 and 182 each with a thyratron tube circuit which includes an alternating voltage source and perhaps a filter means such as a choke input filter. A thyratron or gas filled triode is a rectifying tube through which substantial currents may flow. Functionally, it will be in an ionized or conducting condition only during part of that half cycle of an alternating voltage applied across its plate and cathode which appears positive on its plate.

A thyratron is characterized by a minimum or deionizing positive plate-to-cathode voltage needed to maintain ionization without regard to the grid potential or bias. It is characterized further by a critical grid bias below which the tube cannot conduct. This critical bias will not be a constant value, but will vary according to varying plate-to-cathode potentials. Qualitatively, at the peak of positive voltage on the plate element of the tube the grid must be considerably more negative than at a half-voltage point in order to prevent the tube from conducting, assuming both the peak and half voltages to be greater than the deionizing potential. A still further characteristic of a thyratron is that while the grid potential may control the starting of ionizaion or conducton, it cannot determine the ending of it. Deionization or termination of conduction takes place only when the plate-to-cathode voltage drops below the aforementioned minimum or deionizing value.

If a thyratron be connected directly to a load, and is conducting for at least part of the half cycle of an impressed alternating voltage which is positive on its plate, a pulsating direct voltage will be applied to this load. It will be possible and may be desirable to smooth this load voltage by interposing a filtering or voltage integrating means between the thyratron and the load. The effect of this filter will be to provide a fairly steady supply voltage at the immediate terminals of the load. A very useful filter arrangement, particularly in circuits with variable loads, is one comprising both inductance and capacitance elements configured as a ladder or chain with inductances in series and capacitances in parallel, and having an inductance or choke coil input element at its connection to the thyratron.

Assuming a constant peak value of alternating voltage applied across the thyratron plate and cathode, the value of voltage at the filter output and load input will vary with the thyratron grid potential. Up to the point that the tube ionizes as soon as its plate voltage reaches the minimum or deionizing value, the higher the grid potential the earlier the tube will ionize; that is, the greater will be that part of the half cycle of positive plate-to-cathode potential during which the tube will conduct. Accordingly, until this condition of earliest possible starting of conduction is achieved, increasing grid potential will cause increasing load input voltage.

One characteristic of filter chains, however, which may be undesirable for purposes of this invention is that of imposing a transmission delay time on input voltage signals which may be a significant amount. This will be commented upon in further detail presently.

In an exemplary utilization of a thyratron circuit with potentiometer 156 of the apparatus embodiment of this invention shown in FIGURE 5, the primary winding of a transformer would be connected across the terminals of an alternating voltage source. One side of the transformer secondary winding would be connected to the cathode of a thyratron tube, and the plate of this tube would be connected to one of the input terminals of a suitable filter, a choke input filter for example having two input and two output terminals. The corresponding output terminal of the filter would be connected to the hub of armature 140 from which potentiometer slider 158 had been previously disconnected. The connections of charging circuits 146 shown going to ground would as a group be taken instead to the other output terminal of the filter, and the remaining input terminal of the filter would be connected to the side of the transformer secondary winding opposite from that to which the thyratron cathode was connected.

The connection between the transformer secondary and the tube cathode would be grounded, and the potentiometer slider 158 would be connected to the thyratron grid. This slider would be shifted as necessary on $R_5$ to provide a grid bias sufficiently negative with respect to the cathode to prevent any conduction by the thyratron with the multivibrator output voltage at its lower value of +90 volts. The slider would also be so set on $R_5$, however, that when the multivibrator output voltage achieved its upper value of +300 volts with echoes being received at the radar antenna from a solid target, the grid voltage would be made sufficiently high that there would be conduction in the thyratron and consequently a charging potential applied to armature 140 and thence to a charging circuit 146 for a substantial part of the alternating voltage half cycle in which the plate was held positive. The setting of the slider could be used to control the start of conduction with +300 volts at the multivibrator output, and hence the average output voltage of the thyratron. An arrangement of the kind described is shown in FIGURE 13 wherein a thyratron tube 208 has its grid connected to slider element 158 of potentiometer 156 and is part of a circuit including a filter chain 210 which circuit is connected on its input side through transformer 212 to a source of alternating voltage across terminals $T_{15}$ and $T_{16}$ and on its output side to the hub of armature 140 of pulse distributor 138.

The aforementioned filter will be useful in smoothing the thyratron circuit output. However, considering the limited time that armature 140 bears upon any individual contact block 142 for a single revolution of the radar antenna in azimuth, care must be taken in selecting a filter that it does not unduly delay a charging voltage signal in reaching the armature hub once the thyratron has begun to conduct lest the signal or a substantial part of it be applied to the wrong block 142. Likewise an alternating voltage of relatively high frequency should be applied to the thyratron so that once the grid has been raised in potential upon triggering of the multivibrator there will not be a significant delay in the beginning of conduction while waiting for the plate-to-cathode voltage to get across a negative half cycle.

When the multivibrator output voltage drops back to +90 volts and the thyratron grid potential goes negative to being below what is, in effect, a cutoff value, the tube will continue to conduct if it be in a positive half cycle of plate-to-cathode voltage until this voltage has dropped below the deionizing value. After that, there will be no further conduction even when the plate goes positive with respect to the cathode until the multivibrator output voltage rises again upon radar detection of a solid target. Obtaining of an abrupt end of thyratron conduction and consequently of charging of circuit 146 is another reason for wanting a relatively high frequency voltage applied across the plate and cathode.

In the arrangement just described, the current drawn from the multivibrator is only that needed to give a proper grid voltage, and is not that required for charging of circuit 146. While the application of a thyratron has been discussed with reference mainly to the constant azimuth warning system shown in FIGURE 5, there is no need to give a corresponding discussion with reference mainly to the constant elevation warning system of FIGURE 6 since the two applications would be similar in all essential features.

Although this invention has been described with a certain degree of particularity, it is to be understood that the present disclosure has been made only by way of example, especially with regard to numerical quantities given herein, and that numerous changes in the details of construction and the combination and arrangement of parts may be resorted to without departing from the spirit and scope of this invention as hereinafter claimed. In particular it is to be understood that while frequent reference has been made to radar system installations aboard aircraft and marine vessels, this has not been to the exclusion of application of the present invention to radar systems installed in vehicles of other kinds or in fixed locations.

I claim as my invention:

1. In combination with a radar system which includes a movable antenna and a video amplifier, an anti-collision detection and warning apparatus which comprises at least one pulse distributor mechanism including a movable contact arm and a plurality of contact blocks positioned to be borne upon sequentially by said arm in the course of movement thereof, means connecting said video amplifier and said movable contact arm whereby electrical pulses corresponding on substantially a pulse-per-signal basis to output signals of said video amplifier of at least a certain predetermined magnitude are imposed on said contact arm, means connecting said antenna and said contact arm whereby motion corresponding to the motion of said antenna is imposed on said contact arm, a plurality of charging circuits each including a gas-filled tube designed to be ionized upon its circuit achieving a predetermined charge, and electrical connection means between each of said charging circuits and one of said contact blocks, said predetermined charge being achieved from not less than two of said electrical pulses.

2. An anti-collision detection and warning apparatus according to claim 1 in which said means connecting said antenna and said contact arm imposes motion on said contact arm corresponding to motion in true azimuth of said antenna.

3. An anti-collision detection and warning apparatus according to claim 1 in which said means connecting said antenna and said contact arm imposes motion on said contact arm corresponding to motion in true elevation of said antenna.

4. An anti-collision detection and warning apparatus according to claim 1 which includes audible warning means designed to be energized upon ionization of the gas-filled tube of any one of said charging circuits.

5. An anti-collision detection and warning apparatus according to claim 4 in which said audible warning means comprises a sonic circuit associated with each of said charging circuits, said sonic circuit including a photoelectric cell and an electrically actuated sonic device with said photoelectric cell being disposed to have its active surface illuminated by at least one of said gas-filled tubes.

6. An anti-collision detection and warning apparatus according to claim 4 in which said audible warning means comprises an electrically actuated sonic device in each of said charging circuits, each of said sonic devices being connected in series with the gas-filled tube of the charging circuit of which said sonic device is a component.

7. An anti-collision detection and warning apparatus according to claim 4 in which said audible warning means comprises an electrically actuated sonic device in a line common to a plurality of said charging circuits, said sonic device being connected in series with the gas-filled tube of each of said charging circuits of which said plurality of charging circuits consists.

8. In combination with a radar system which includes a movable antenna and a video amplifier, an anti-collision detection and warning apparatus which comprises (1) at least one pulse distributor mechanism including a movable contact arm and a plurality of contact blocks positioned to be borne upon sequentially by said arm in the course of movement thereof, (2) means connecting said video amplifier and said movable contact arm whereby electrical pulses corresponding on substantially a pulse-per-signal basis to at least some of the output signals of said video amplifier are imposed on said contact arm, said means including a one-shot multivibrator connected to receive input signals corresponding to the output signals of said video amplifier and designed to be triggered by only those input signals corresponding to video amplifier output signals of at least a certain predetermined magnitude, and which further includes electrical connection means between the output terminal of said multivibrator and said movable contact arm, (3) means connecting said antenna and said contact arm whereby motion corresponding to the motion of said antenna is imposed on said contact arm, (4) a plurality of charging circuits each containing a gas-filled tube designed to be ionized upon its circuit achieving a predetermined charge, and (5) electrical connection means between each of said charging circuits and one of said contact blocks.

9. An anti-collision detection and warning apparatus according to claim 8 in which said electrical connection means between the output terminal of said multivibrator and said movable contact arm includes a potentiometer having one terminal of the resistor element thereof connected to said multivibrator and having the slider element thereof connected to said movable contact arm.

10. An anti-collision detection and warning apparatus according to claim 8 in which said electrical connection means between the output terminal of said multivibrator and said movable contact arm includes an electro-mechanical relay connected to said multivibrator and designed to be closed across its external terminals by an output pulse from said multivibrator, and which further includes a power line from an external voltage source connected to said contact arm, said line being interrupted at the external terminals of said relay.

11. An anti-collision detection and warning apparatus according to claim 8 in which said electrical connection means between the output terminal of said multivibrator and said movable contact arm includes a thyratron circuit designed for at least half wave rectification, said thyratron circuit being connected on its input side to a source of alternating voltage and on its output side to said movable contact arm, and having the grid element of the thyratron tube member thereof connected to said multivibrator.

12. In combination with a radar system which includes a movable antenna, a video amplifier, and at least one indicator whereon position of target objects is presented visually, an anti-collision detection and warning apparatus which comprises at least one pulse distributor mechanism including a movable contact arm and a plurality of contact blocks positioned to be borne upon sequentially by said arm in the course of movement thereof, means connecting said video amplifier and said movable contact arm whereby electrical pulses corresponding on substantially a pulse-per-signal basis to output signals of said video amplifier of at least a certain predetermined magnitude are imposed on said contact arm, means connecting said antenna and said contact arm whereby motion corresponding to the motion of said antenna is imposed on said contact arm, a plurality of charging circuits each including a gas-filled tube designed to be ionized upon its circuit achieving a predetermined charge and the tubes of the several charging circuits being visibly disposed in spaced relation to said visual indicator corresponding to predetermined position intervals, and electrical connection means between each of said charging circuits and one of said contact blocks.

13. An anti-collision detection and warning apparatus according to claim 12 in which said position of said target objects is presented visually in true azimuth on said indicator, and in which said means connecting said antenna and said contact arm imposes motion on said contact arm corresponding to motion in true azimuth of said antenna.

14. An anti-collision detection and warning apparatus according to claim 12 in which said position of said target objects is presented visually in true elevation on said indicator, and in which said means connecting said antenna and said contact arm imposes motion on said contact arm corresponding to motion in true elevation of said antenna.

15. In combination with a radar system having an antenna movable in both azimuth and elevation and a video amplifier, an anti-collision detection and warning apparatus which comprises first and second pulse distributor mechanisms each including a movable contact arm and a plurality of contact blocks positioned to be borne upon sequentially by the arm corresponding thereto in the course of its movement, means connecting said video amplifier and said contact arms whereby electrical pulses corresponding on substantially a pulse-per-signal basis to output signals of said video amplifier of at least a certain predetermined magnitude are imposed on each of said contact arms, means connecting said antenna and said contact arms whereby motion corresponding to the motion in azimuth of said antenna is imposed on the contact arm of said first pulse distributor and motion corresponding to the motion in elevation of said antenna is imposed on the contact arm of said second pulse distributor, a plurality of charging circuits each including a gas-filled tube designed to be ionized upon its circuit achieving a predetermined charge, and electrical connection means between each of some of said charging circuits and one of said contact blocks of said first pulse distributor and between each of the others of said charging circuits and one of said contact blocks of said second pulse distributor.

16. In combination with a radar system which includes an antenna movable in both azimuth and elevation, a video amplifier, a first indicator whereon position in azimuth of target objects is presented visually, and a second indicator whereon position in elevation of target objects is presented visually, an anti-collision detection and warning apparatus which comprises first and second pulse distributor mechanisms each including a movable contact arm and a plurality of contact blocks positioned to be borne upon sequentially by the arm corresponding thereto in the course of its movement, means connecting said video amplifier and said contact arms whereby electrical pulses corresponding on substantially a pulse-per-signal basis to output signals of said video amplifier of at least a certain predetermined magnitude are imposed on each of said contact arms, means connecting said antenna and said contact arms whereby motion corresponding to the motion in azimuth of said antenna is imposed on the contact arm of said first pulse distributor and motion corresponding to the motion in elevation of said antenna is imposed on the contact arm of said second pulse distributor, a plurality of charging circuits each including a gas-filled tube designed to be ionized upon its circuit achieving a predetermined charge and the tubes of some of said charging circuits being visibly disposed in spaced relation to said first visual indicator corresponding to predetermined azimuth intervals and the tubes of the others of said charging circuits being visibly disposed in spaced relation to said second visual indicator corresponding to predetermined elevation intervals, and electrical connection means between each of said charging circuits of which the gas-filled tubes are disposed in spaced relation to said first visual indicator and one of said contact blocks of said first pulse distributor and between each of said charging circuits of which the gas-filled tubes are disposed in spaced relation to said second visual indicator and one of said contact blocks of said second pulse distributor.

17. An anti-collision detection and warning method which comprises the steps of receiving radar echoes from a target object on a substantially constant true bearing;

generating electrical charging pulses corresponding to said echoes; storing said charging pulses cumulatively to achieve a predetermined level of electrical charge, and dissipating said charge by applying it to a defined gaseous material to cause ionization of and flow of current through said material.

18. A method according to claim 17 in which said ionization of said defined gaseous material constitutes a readily visible phenomenon.

19. A method according to claim 18 in which said defined gaseous material is located in visible spaced relation to a predetermined presentation region of a visual target indicator, and which includes the step of observing target presentations in this region upon ionization of said gaseous material.

20. A method according to claim 17 which includes the step of using said flow of current to actuate a sonic device.

References Cited in the file of this patent

UNITED STATES PATENTS

| | | |
|---|---|---|
| 2,410,424 | Brown | Nov. 5, 1946 |
| 2,811,715 | Baker | Oct. 29, 1957 |
| 2,879,502 | Miller | Mar. 24, 1959 |
| 2,952,839 | Capanna | Sept. 13, 1960 |
| 2,957,082 | Plass | Oct. 18, 1960 |
| 2,969,539 | Miner | Jan. 24, 1961 |
| 3,040,314 | Hesse | June 19, 1962 |

FOREIGN PATENTS

| | | |
|---|---|---|
| 883,610 | France | July 9, 1943 |
| 722,557 | Great Britain | Jan. 26, 1955 |